Patented Apr. 8, 1930

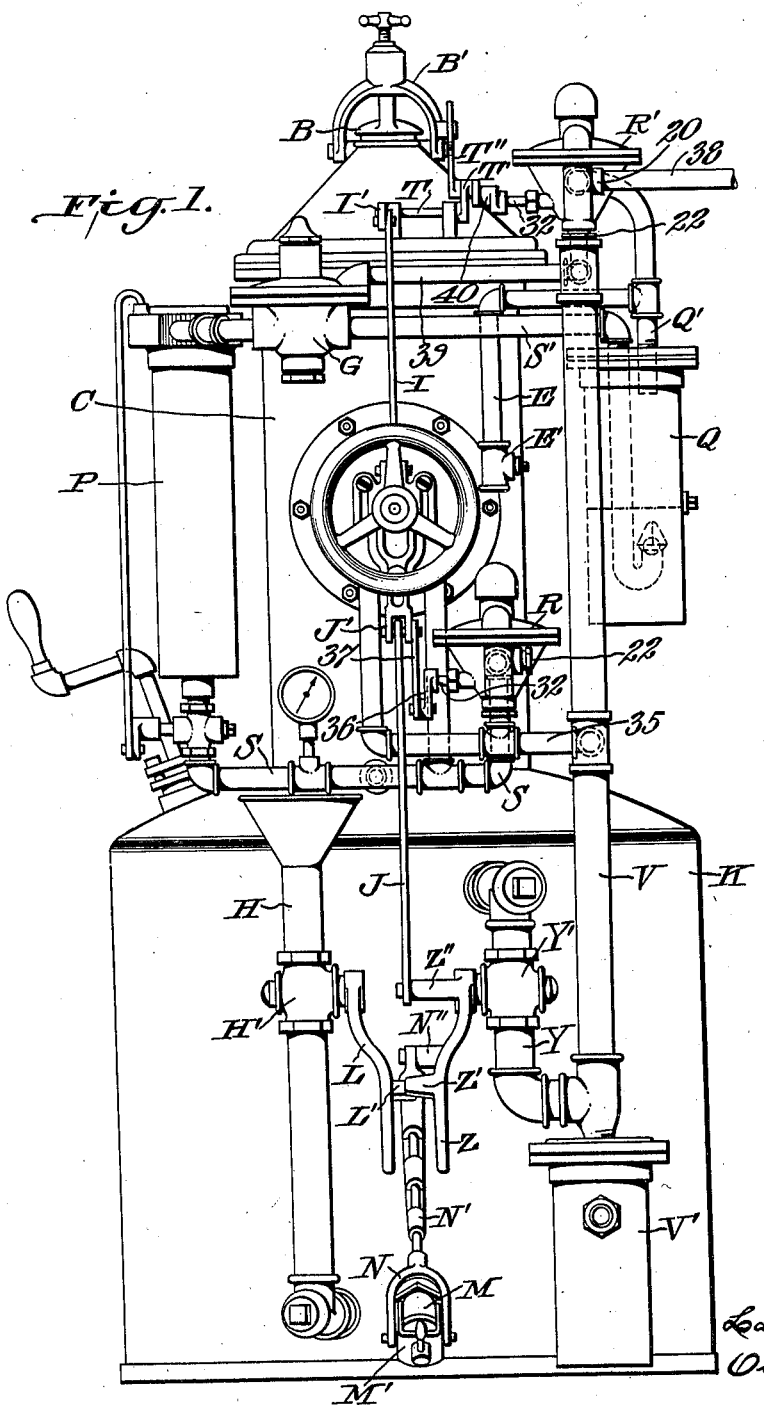

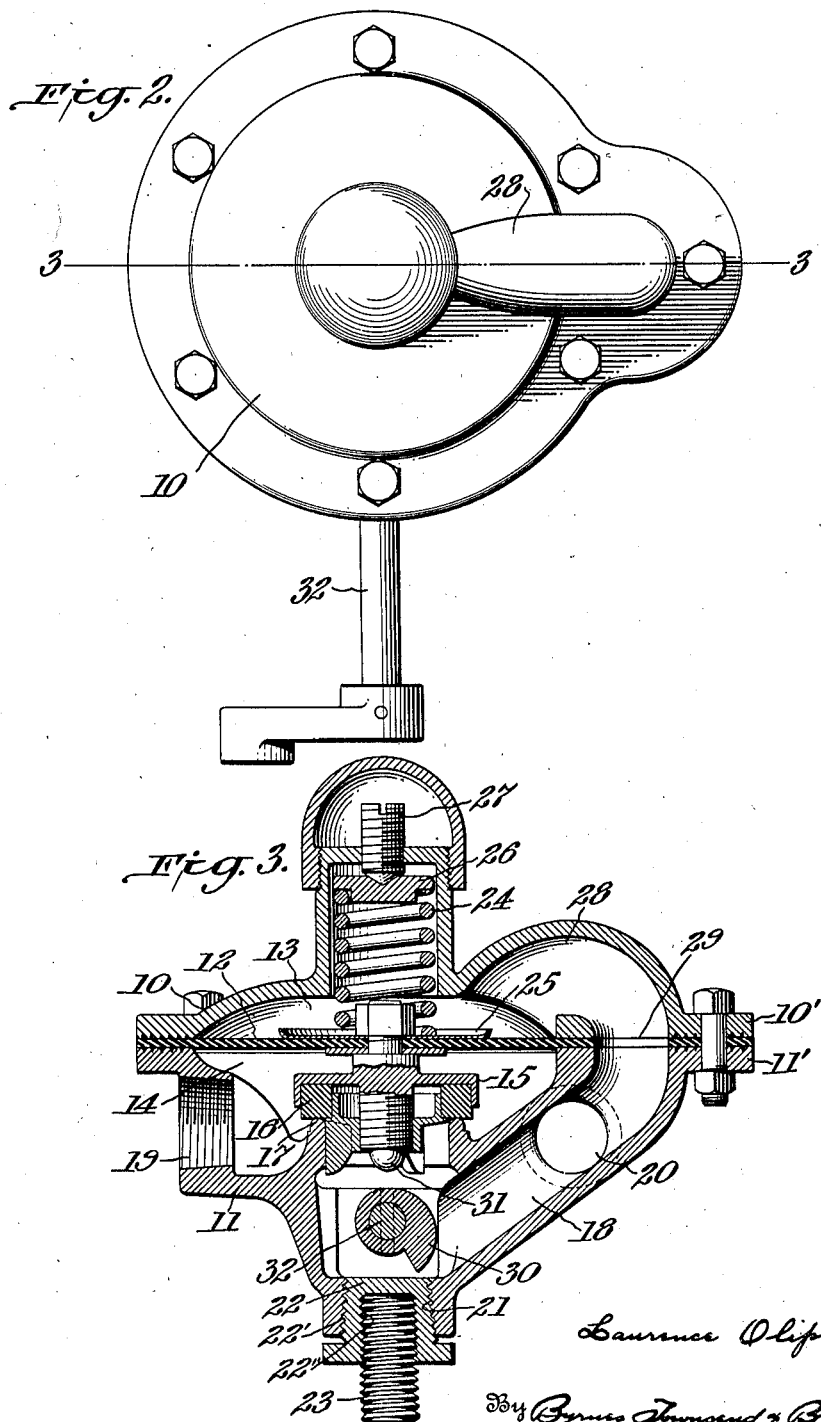

1,753,529

UNITED STATES PATENT OFFICE

LAURENCE OLIPHANT, OF TRENTON, NEW JERSEY, ASSIGNOR TO OXWELD ACETYLENE COMPANY, A CORPORATION OF WEST VIRGINIA

ACETYLENE GENERATOR

Application filed August 30, 1923. Serial No. 660,242.

This invention relates to acetylene generators and more particularly to improved means for venting such generators when the pressure therein becomes excessive and also when the generator is opened to supply water or carbide thereto or to drain it.

Acetylene generators are generally provided with safety devices such as relief valves adapted to relieve an excessive pressure which may build up in the generator. Obviously such valves seldom need to function and because of such non-use the valve face may in time "freeze" to its seat, so that the action of the valve is not dependable. To avoid such "freezing", a relief valve has been used which will be unseated when the generator is charged with carbide or water and when the sludge is drawn off.

The principal object of this invention is to provide a simple and compact relief valve for acetylene generators. Another object is to provide an improved safety and venting system for generators which are used to supply acetylene to oxy-acetylene metal cutting and welding appliances, such as blowpipes.

The above and other objects and the novel features of this invention will be apparent from the following description taken with the accompanying drawings, in which:

Fig. 1 is a front elevation of an acetylene generator equipped with relief valves embodying this invention, and Figs. 2 and 3 are, respectively, a plan view and a vertical section, on the line 3—3 of Fig. 2, illustrating an improved relief valve embodying this invention.

For the purpose of disclosing this invention, the acetylene generator illustrated is one adapted to supply acetylene to oxy-acetylene blowpipes and similar appliances for cutting and welding metals, and comprises a carbide feed chamber C combined with a generating chamber K. The generator is provided with a carbide filling opening having a cap B held in place by a pivoted yoke B'; a water feed pipe H which has a cock H'; a vent and water overflow pipe Y which has a cock Y'; and a residuum outlet M which has a pivoted cover M'. The yoke B', cocks H' and Y' and cover M' may be interconnected by suitable mechanism to insure that the generator will be vented when it is drained or charged with carbide or water. As shown, the cock H' has an arm L that has a projection L' adapted to engage a projection Z' on the lever Z that controls the venting cock Y'; the cover M' carries a pivoted yoke N that is connected by the extensible rod N' to a pivotal projection N'' on the lever Z; and by a system of links J, J', I; lever I'; rock shaft T; and crank arms T', T''; the yoke B' is connected to the projection Z'' on the lever Z. The main service pipe S receives gas from the generating chamber and delivers it to the filter P, then to a regulating valve G, and through pipe S' to a hydraulic check valve Q, which has a ball check valve under the water level therein. The outlet pipe Q' of the valve Q is connected by a pipe E to the service outlet E' for supplying the acetylene to blowpipes or other appliances.

To protect the generator against dangerous pressures, a relief valve R may be coupled to the main service pipe S, and another relief or safety valve R' may be coupled to the pipe Q' to permit escape of oxygen backing into the valve Q from the service pipe E. The relief valves R and R' are desirably, though not necessarily, of the same construction which, as illustrated in Figs. 2 and 3, comprises upper and lower hollow complementary sections 10 and 11 having flanges 10' and 11' secured together to provide a casing. A diaphragm 12 of suitable yieldable material is clamped between said flanges and divides the casing into two compartments 13 and 14. A valve 15 is mounted on the lower side of the diaphragm and provided with a seating face 16 that seats against a seat 17 at the entrance of a vent or outlet passage 18 formed in the lower casing section 11. The compartment 14 has an inlet 19 which may be coupled to the gas line to be protected, and the passage 18 has two outlets 20 and 21 which may be alternatively coupled to a vent pipe, the outlet not in use being closed. As shown in Fig. 3, the outlet 21 is closed off by a plug 22 having external threads 22' and internal threads 22'' by means of which it may be coupled to the valve casing and to a nipple 23, whereby the casing may be mounted at its bottom end upon a support adapted to fit the nipple.

A spring 24 in the casing section 10 has one end bearing against a metal disk 25 upon the upper side of the diaphragm 12 and its other end bears against a plate 26 that is engageable by an adjustable screw 27, whereby one may vary the pressure against the diaphragm and determine the pressure at which the valve 15 will be lifted off its seat. The casing section 10 also contains a vent passage 28 which communicates with the compartment 13 and opens directly into the vent passage 18 at 29, a circular portion of the diaphragm being removed at this point. This arrangement of vents within the casing and direct connection of the same eliminates piping and leakage.

The valve face 16 may be of rubber or soft metal which, during a period of non-use, may adhere to the metal seat 17, whereupon a much higher pressure is required in the compartment 14 to lift the valve and relieve the pressure. To avoid such "freezing", it has heretofore been proposed to lift this valve from time to time by means located in the compartment 13 and operated whenever the generator is opened to charge it with carbide or water. According to this invention, a simplified device is disposed in the vent passage 18 below the valve to lift it off its seat. Normally, the valve may operate freely independently of the unseating device or lifting means, which comprises a cam 30 that is adapted to engage the rounded lower end 31 of the valve. The cam is carried by a shaft 32 that is rockably mounted in the casing member 11 and has a suitable operating crank mounted on the outside part thereof.

As shown in Fig. 1, the inlet 19 of the relief valve R is connected to the main service pipe S, the side vent outlet is closed by the plug 22, and the lower vent outlet 21 is connected to a pipe 35 that leads to the main vent pipe V rising from the vent trap V', into which the vent pipe Y discharges. The valve R is thus rigidly supported at the bottom and rear, and the shaft 32 of its valve-lifting cam is connected by crank arm 36 and pivoted link 37 to the member J' of the interconnecting linkage system. The inlet 19 of the relief valve R' is connected to the service pipe Q and its vent outlet 20 may be connected to a vent pipe 38, while the plug 22 in the outlet 21 supports the relief valve on a vent pipe 39 leading from the regulating valve G to the main vent pipe V. The valve R' is thus rigidly supported by pipes Q and 39. For safety purposes, the vent lines V and 38 are independent of one another. The cam shaft of the valve R' may be coupled to the interconnecting linkage system by a crank device 40 connected to the arm T'. It will thus be apparent that both valves R and R' will be unseated every time any inlet or outlet of the generator is opened to charge carbide or water or remove residuum, thereby preventing "freezing" of these valves and providing a safer generator.

I claim:

1. In a relief valve, the combination of upper and lower complementary members providing a casing, a diaphragm clamped between said members, means in said upper member for adjusting the pressure against one side of said diaphragm, the lower member comprising an inlet and a vent passage having a valve seat at its entrance opposite said diaphragm, said vent passage having two outlets adapted to be alternatively coupled to a vent pipe and to a supporting means, a valve in said lower member operable by said diaphragm and cooperating with said seat, and means in said vent passage operable to engage the lower end of said valve to lift it from said seat.

2. In a relief valve, the combination of complementary members providing a casing, one of said members, comprising an inlet and a vent passage therein, the other member comprising a vent passage therein opening within said casing into the first mentioned vent passage, one of said vent passages having a plurality of outlets, adapted to cooperate alternatively with a vent pipe and a supporting means, a diaphragm in said casing, and a valve operable by said diaphragm to control the flow from said inlet to said outlet.

3. In a relief valve, the combination of upper and lower complementary members providing a casing, a diaphragm clamped between said members, the lower member comprising an inlet and a vent passage terminating in a valve seat at its entrance opposite said diaphragm, by a supporting means, the vent passage in said lower member having two outlets either of which may be coupled to a vent pipe and the other closed, a valve operable by said diaphragm and cooperating with said seat, the upper member having a vent passage opening directly into the vent passage in the lower member, and means in the lower member for lifting said valve from its seat.

4. In a relief valve, the combination of a casing comprising an inlet and a vent passage having an outlet at the bottom of the casing whereby the latter may be supported by a pipe or plug coupled thereto at said outlet, said casing having another outlet, such outlets being adapted to be closed alternatively, a diaphragm in said casing and subject to the pressure in said inlet, and a valve operable by said diaphragm to control the flow from said inlet to said vent passage.

5. In a valve, the combination of complementary members providing a casing, one of said members comprising an inlet and an outlet passage, the other member comprising an outlet passage, said members having registering openings establishing direct communication between said outlet passages, a valve controlling the flow from said inlet to the first mentioned outlet passage, and pressure responsive means subject to the pressure in said inlet and operatively connected to said valve to unseat the latter, said outlet passage having a plurality of openings and means adapted to be inserted alternatively therein for the support thereof.

6. A valve having an outlet passage provided with two discharge openings in combination with a discharge pipe and a closure plug interchangeably coupled to said openings, and means whereby said plug is provided with members by which said valve may be secured to a support.

7. In a valve, the combination of complementary members providing a casing, one of said members comprising an inlet and an outlet passage, the other member comprising an outlet passage, said members having registering openings establishing direct communication between said outlet passages, a valve controlling the flow from said inlet to the first-mentioned outlet passage, pressure responsive means for operating said valve, said casing having two discharge openings communicating with said outlet passages, a discharge pipe and a closure plug interchangeably coupled to said discharge openings, and mechanically-operable means in the first-mentioned outlet for operating said valve.

8. In a relief valve, a substantially conical casing member having an inlet and an outlet, a substantially dome-shaped casing member arranged with its open end cooperating with the larger end of said conical member to provide a hollow vessel, a diaphragm firmly secured between said casing members and forming therewith two chambers, exterior wall members integral with each of said casing members and forming therewith a passage communicating between said chambers, a substantially cylindrical member disposed within and coaxial of said conical member and extending to meet the walls thereof, said cylindrical member having a valve seat at its open end, a valve cap, a valve stem securing said valve cap to said diaphragm and arranged to close said valve seat to provide two chambers in said conical member, and a cam cooperating with said valve stem and disposed in that one of said last-named chambers formed by the apex portion of the conical member.

9. In a relief valve, a substantially conical casing member having an inlet and an outlet, a substantially dome-shaped casing member arranged with its open end cooperating with the larger end of said conical member to provide a hollow vessel, a diaphragm firmly secured between said casing members and forming therewith two chambers, exterior wall members integral with each of siad casing members and forming therewith a passage communicating between said chambers, said outlet being disposed in the walls of said passage intermediate the ends of said passage, a substantially cylindrical member disposed within and coaxial of said conical member and extending to meet the walls thereof, said cylindrical member having a valve seat at its open end, a valve cap, a valve stem securing said valve cap to said diaphragm and arranged to close said valve seat to provide two chambers in said conical member, and a cam cooperating with said valve stem and disposed in that one of said last-named chambers formed by the apex portion of the conical member.

In testimony whereof, I affix my signature.

LAURENCE OLIPHANT.